K. MEDER.
FISHPOLE TIP.
APPLICATION FILED MAY 22, 1914.
1,116,721.
Patented Nov. 10, 1914.
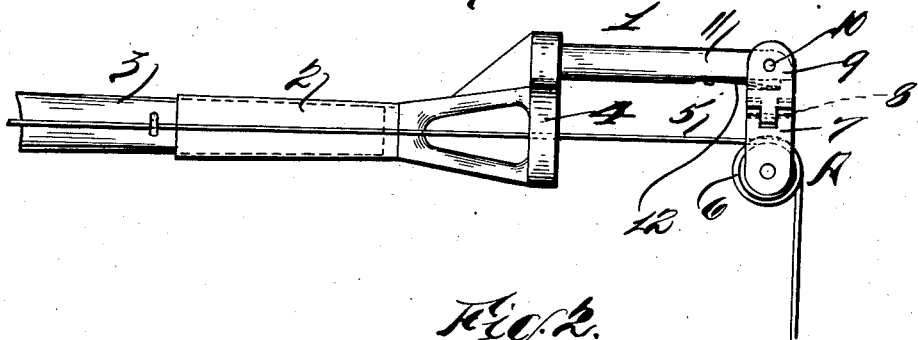
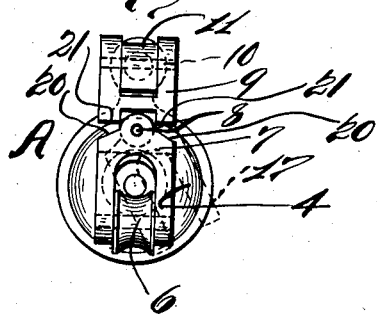
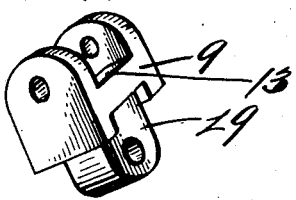
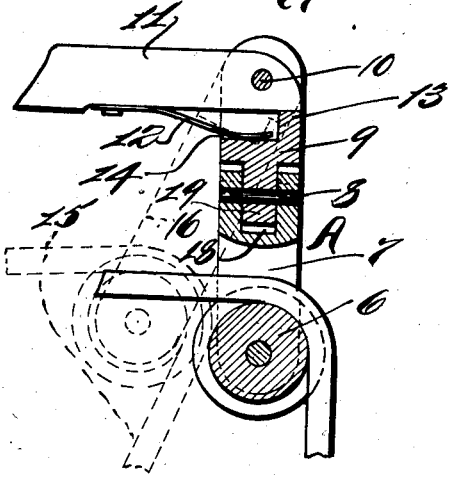
Witnesses
E. A. Jarris
David Heishfield
Inventor:
Karl Meder
by Maurice Block
attorney.

UNITED STATES PATENT OFFICE.

KARL MEDER, OF NEW YORK, N. Y.

FISHPOLE-TIP.

1,116,721.  Specification of Letters Patent.  Patented Nov. 10, 1914.

Application filed May 22, 1914. Serial No. 840,169.

*To all whom it may concern:*

Be it known that I, KARL MEDER, a citizen of the United States of America, residing at New York city, Manhattan borough, county and State of New York, have invented certain new and useful Improvements in Fishpole-Tips, of which the following is a full, clear, and exact description.

This invention relates to an improvement in fishing-pole tips, the object being to provide such an article that will yield or give in the direction of pull upon the line, that is to say, if a fish pulls the line toward the right or left, that portion of the tip which supports the line will give to the right or left, thereby decreasing the strain upon the line, at the same time indicating to the one fishing in which direction to move the pole in order to hook the fish. My improved tip will also give or yield rearwardly or toward the pole should a fish take that direction. In short, my improved tip is designed to give in the directions which ordinarily put a strain upon a line.

I will now proceed to describe my invention in detail, the novel features of which I will point out in the appended claims, reference being had to the accompanying drawing, forming part hereof, wherein:

Figure 1 is a side elevation of my improved fishing-pole tip, a portion of a pole being also shown; Fig. 2 is an enlarged end view thereof; Fig. 3 is a perspective view of one of the tip elements, and Fig. 4 is an enlarged sectional view of a portion of the tip, showing the manner of universally connecting the movable tip members.

As herein illustrated, my improved tip is indicated in a general way by the numeral 1, and consists of a socket member 2 to receive the end of a pole 3. The socket member 2 is provided with an eye 4 through which the line 5 is passed to the rotatable pulley 6. The pulley 6 is carried by a block 7, pivotally secured at 8 to a block 9, which in turn is pivotally secured at 10 to an arm 11 carried by the socket member 2.

The movable portion of the tip 1, indicated as a whole by A, constitutes a universal movable frame adapted to move in various directions. The frame A is held in its normal position by a spring 12 in combination with an abutment 13 adapted to contact with the arm 11 to limit the forward movement of the universally movable frame A.

The free end of the spring 12 rests in a pocket 14 adjacent the abutment 13. Should a fish pull the line toward the pole, as shown by dotted lines 15, Fig. 4, the frame A will swing upon the pivot point 10 in the direction of pull, as shown by dotted lines 16 Fig. 4. Should a fish pull the line to the right the frame member 7 will swing upon its pivot 8 in said direction as shown by dotted lines 17, Fig. 2.

The frame member 7 is provided with a slot 18 to receive the tongue 19 on the frame member 9, and is further provided with shoulders 20 which will strike the abutments 21 on the frame member 9. Should the block move to the right or left far enough the abutments 21 and shoulders 20 limit the side movement of the block 7.

By means of my improved tip, the line is kept from being forced against the side walls of the eye 4 and thus guarded against undue wear and consequent breakage.

Having now described my invention, what I claim and desire to secure by Letters Patent is:

1. A fishing-pole tip, comprising a socket-member, a block pivotally secured thereto and adapted for movement in the direction of the axis of the socket-member, and a second block pivotally secured to the first named block and adapted for movement at substantially a right angle to the movement of the first named block and arranged to receive a fishing line.

2. A fishing-pole tip, comprising a socket-member, an arm carried thereby, a block pivotally secured to said arm, a spring carried by said arm and bearing against said tip, a second block pivotally secured to the first named block, and adapted for movement at a right angle to the movement of the first named block, and a pulley carried by the second block.

Signed at New York city, N. Y., this 21 day of May, 1914.

KARL MEDER.

Witnesses:
 EDWARD A. JARVIS,
 MAURICE BLOCK.